(12) United States Patent
Dehn et al.

(10) Patent No.: US 7,896,291 B2
(45) Date of Patent: Mar. 1, 2011

(54) AIRCRAFT DOOR WITH OVERSIZING

(75) Inventors: Martin Dehn, Möllenbeck (DE); Ingo Wuggetzer, Wörthsee (DE); Ugur Ipek, Buxtehude (DE); Christoph Mühlich, Berlin (DE)

(73) Assignee: Airbus Deutschland GmbH (DE)

( * ) Notice: Subject to any disclaimer, the term of this patent is extended or adjusted under 35 U.S.C. 154(b) by 86 days.

(21) Appl. No.: 12/247,074

(22) Filed: Oct. 7, 2008

(65) Prior Publication Data

US 2009/0173825 A1    Jul. 9, 2009

Related U.S. Application Data

(63) Continuation of application No. PCT/EP2007/002770, filed on Mar. 28, 2007.

(30) Foreign Application Priority Data

Apr. 10, 2006   (DE) .......................... 10 2006 016 755

(51) Int. Cl.
*B64C 1/14* (2006.01)
(52) U.S. Cl. .................................................. 244/129.5
(58) Field of Classification Search .................. 244/119, 244/120, 129.1, 129.4, 129.5
See application file for complete search history.

(56) References Cited

U.S. PATENT DOCUMENTS

| 3,119,441 | A | 1/1964 | Furry, Jr. |
| 5,678,787 | A | 10/1997 | Kahn et al. |
| 6,474,600 | B1 * | 11/2002 | Apps ......................... 244/137.1 |

FOREIGN PATENT DOCUMENTS

| GB | 144257 | 7/1921 |
| GB | 579708 | 8/1946 |
| WO | 98/25817 | 6/1998 |
| WO | 01/23254 A1 | 4/2001 |
| WO | 03104080 A1 | 12/2003 |
| WO | 2005110843 A2 | 11/2005 |

OTHER PUBLICATIONS

Chinese Office Action for Application No. 200780012653.X mailed Jun. 21, 2010.

* cited by examiner

*Primary Examiner* — Timothy D Collins
*Assistant Examiner* — Valentina Xavier
(74) *Attorney, Agent, or Firm* — Ingrassia Fisher & Lorenz, P.C.

(57) ABSTRACT

An aircraft fuselage section is provided in which an outer skin construction provides at least one door opening having a width, such that it is divided by at least one rib of the fuselage skeleton of the aircraft fuselage section into multiple opening areas.

9 Claims, 3 Drawing Sheets

AIRCRAFT DOOR WITH OVERSIZING

CROSS-REFERENCE TO RELATED APPLICATION

This application is a continuation of International Application No. PCT/EP2007/002770, filed Mar. 28, 2007, which was published under PCT Article 21(2) and which claims priority to German Patent Application No. 10 2006 016 755.4 filed Apr. 10, 2006 and of U.S. Provisional Patent Application No. 60/790,690 filed Apr. 10, 2006, the disclosure of which applications is hereby incorporated herein by reference.

TECHNICAL FIELD

The present invention relates generally to the technical field of aircraft design in the sense of the technical-constructive design. In particular, the invention relates to an aircraft fuselage section with an outer skin construction, which is adapted to the fuselage skeleton of the aircraft fuselage section in a special manner. In addition, the invention relates to an aircraft, which is equipped with at least one such aircraft fuselage section.

BACKGROUND OF THE INVENTION

Cabin doors for entering the passenger cabin of an aircraft are usually kept small deliberately, in order not to weaken the support structure of the aircraft made up of the fuselage skeleton and outer skin more than necessary as a result of the door opening for the cabin door. The larger the discontinuity in the outer skin as a result of the door opening, the larger is the loss of stability of the support structure in the area of the cabin door. In order to keep the loss of stability as small as possible, therefore, the cabin doors are deliberately kept small, as already mentioned, and are located in the area of a frame or rib, which however is interrupted at the place at which the door opening should be located. In order to compensate for this loss of stability, accordingly the respective adjacent ribs are formed in a reinforced manner. Based on this arrangement between two ribs, cabin doors today are very narrow, which during boarding may lead to accumulation and holdup of passengers at the cabin doors, who would like to enter the aircraft as quickly as possible.

SUMMARY

Based on the previously described problems that may occur during boarding by the formation of a backup or accumulation of passengers, it may be desirable to have a realization, with which the danger of the formation of congestion of passengers pushing into the aircraft interior may be reduced.

According to an embodiment of the invention a specially formed aircraft fuselage section as well as an aircraft, which is equipped with at least one such aircraft fuselage section are provided. The aspects referred to next with reference to the aircraft fuselage section therefore relate in a corresponding manner also to the aircraft, which is equipped with at least one aircraft fuselage section according to an embodiment of the present invention.

According to a first aspect of the present invention, the aircraft fuselage section—has a fuselage skeleton, which includes a plurality of transverse ribs spaced in the longitudinal direction of the aircraft fuselage, whereby under transverse ribs, ribs that are oriented transverse to the fuselage longitudinal direction are to be understood. In addition to the fuselage skeleton, the aircraft fuselage section further has an outer skin construction, which is mounted on the outside of the fuselage skeleton. Metal or aluminum sheets fitted to the contour of the fuselage skeleton may act as this outer skin construction, for example, which are riveted to the outside of the fuselage skeleton. For reducing the danger of the formation of congestion or a backup during boarding, at least one door opening is provided in the outer skin construction, which has a width, such that by means of at least one skeletal component of the fuselage skeleton, the door opening is subdivided vertically in multiple opening areas. In other words, the door opening has a width, such that it not only extends in the rib field between two adjacent ribs; in addition, the door opening is formed to be of a width, such that it extends away over at least one rib of the fuselage skeleton, so that this at least one rib subdivides the door opening into two opening areas to the right and left of the rib.

Such a widely-formed door opening may depart completely from the ways used up until now, in which it was deliberately sought to keep the cabin doors small. The embodiments of the present invention, therefore, may depart from this path for the first time and deliberately accepts a possible negligibly greater structure weakening of the aircraft fuselage in the area of the cabin door in favor of the fact that by means of the wide formation of the door opening, the danger of congestion forming during boarding may be reduced.

The danger of congestion forming, however, may not be reduced alone by the fact that the door opening has a larger width than known door openings; in addition, tests have provided that the rate of flow of a crowd of people flowing through a constricted opening may be controlled specifically by a defined obstacle in the constricted opening, such as for example, the rib in the area of the door opening, so that a congestion-free flow rate of the crowd of people passing through the constricted opening may be permitted.

As with the previously described embodiments, for example, a plurality of ribs of the fuselage skeleton may act as the at least one skeletal component, which vertically subdivides the door opening, which subdivides the door opening into multiple opening areas. Of course, it may also be possible to provide a specialized skeletal component for the purpose of avoiding congestion in the area of the door opening; since, however, the ribs of the fuselage skeleton are already arranged at regular spacings in the longitudinal direction of the aircraft fuselage, it is proposed to arranged the door opening such that is lies in the area of at least one rib, which contributes in a desired manner specifically to the flow regulation. The at least one rib subdivides as observed in one view the at least one door opening into multiple opening areas separated from one another by the rib. In this connection, the at least one rib passes through the at least one door opening observed in view in a direction running substantially vertically.

While the previous passages exclusively teach that at least one rib or at least one skeletal component subdivides the door opening into multiple opening areas, this does not mean, however, that it must exclusively be a single skeletal component or a single rib. In addition, for example, also two or even more ribs may subdivide the door opening into multiple opening areas, whereby the door opening, for example, in the case of two ribs, is subdivided into three opening areas.

Since the cabin door for sealing the door opening has a much greater thickness than the outer skin construction, it is proposed to reposition at least one rib at least in the area of the at least one door opening in the direction of the inner space formed by the aircraft fuselage, such that the door in the closed state is flush with the remaining outer skin construction and does not project out over the remaining contour of the outer skin construction. With the repositioned design of the at least one rib in the area of the door opening, the cabin door can fit flush with the remaining outer skin construction, which is course desirable on aerodynamic grounds.

Since it may be desirable to design the door opening to be of a width such that it would extend over two ribs, and at the same time, only one rib should be provided in the opening area of the door for flow regulation, however, so that the door opening is subdivided into two opening areas, the skeletal components, which are provided in the area of the door opening, may be formed by two adjacent ribs, which are combined in the area of the door opening to one component. In this manner, an inflowing group of people are assigned to two defined, larger opening areas, so that during boarding, the passengers can be assigned to a front seating area and a back seating area in the passenger cabin at an early stage.

Since the cabin door design of the embodiments of the present invention with at least one rib located in the door opening is suited particularly for specific flow control of passengers flowing through the cabin door, the at least one door opening may be located in the outer skin construction, such that it forms an entry to the passenger cabin area of the aircraft, which is horizontally delimited by an intermediate floor in the aircraft fuselage from a cargo area located there under.

Since with the at least one rib in the area of the door opening the passenger flow may be divided at an early stage during boarding into two defined passenger flows, the at least one door opening can be arranged on the outer skin construction in a center area of the passenger cabin area, so that starting from the at least one door opening, a first passenger flow can be moved specifically in the direction of a front seating area in the passenger cabin area and a second passenger flow can be moved specifically in the direction of a back seating area of the passenger cabin area.

In order not to weaken too much the aircraft fuselage section during the flight based on the larger door opening, the aircraft fuselage section in addition may have a cabin door, which may be formed as a supporting fuselage component. In order to enable cooperation with the remaining aircraft section as a supporting component, the cabin door has an outer contour, which is specifically aligned on the inner contour of the door opening, so that the cabin door is perfectly fitted and can befitted in a flush manner in the door opening with the outer skin construction of the aircraft fuselage section.

BRIEF DESCRIPTION OF THE DRAWINGS

The present invention will hereinafter be described in conjunction with the following drawing figures, wherein like numerals denote like elements.

In all of the figures, the same or similar components are designated with the same reference numerals. The representations in the figures may not be to scale, but still may provided quantitative proportions.

DETAILED DESCRIPTION

The following detailed description is merely exemplary in nature and is not intended to limit application and use. Furthermore, there is no intention to be bound by any theory presented in the preceding summary and background or the following detailed description.

Figure 1:
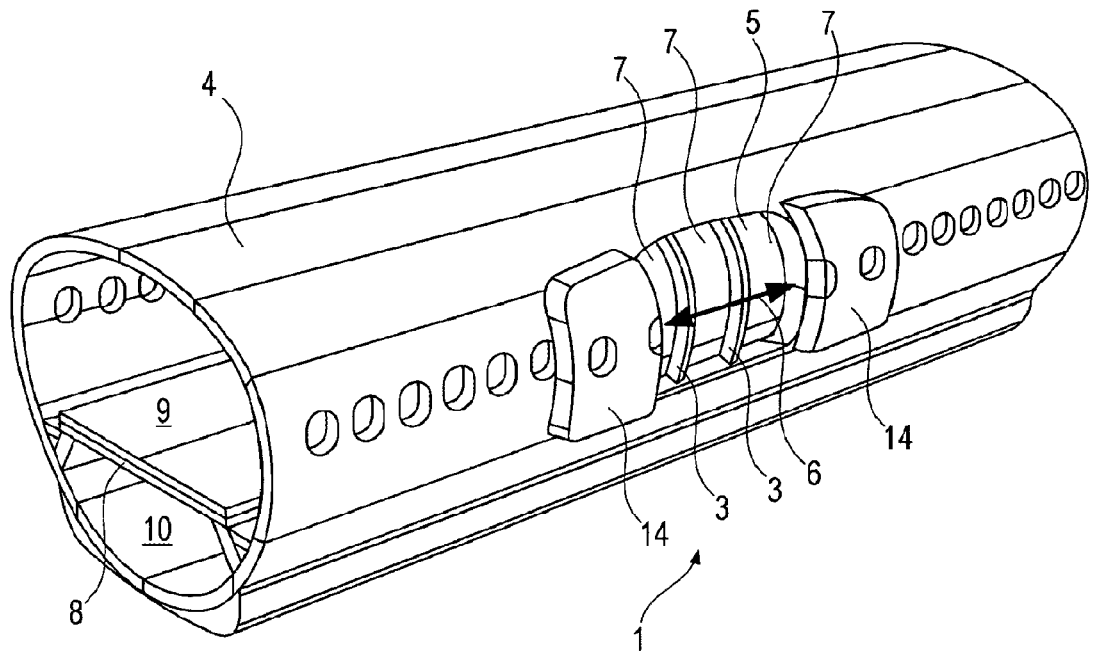
FIG. 1 shows a perspective representation of the aircraft fuselage section of the present invention.

FIG. 1 shows the aircraft fuselage section 1 of an embodiment of the present invention in a perspective representation. As may be seen from this, the aircraft fuselage section 1 is divided into a passenger cabin area 9 and a cargo space area 10, whereby the passenger cabin area 9 is separated from the cargo space area 10 by an intermediate floor 8, which penetrates the aircraft fuselage section 1 horizontally like a cord.

Figure 2:
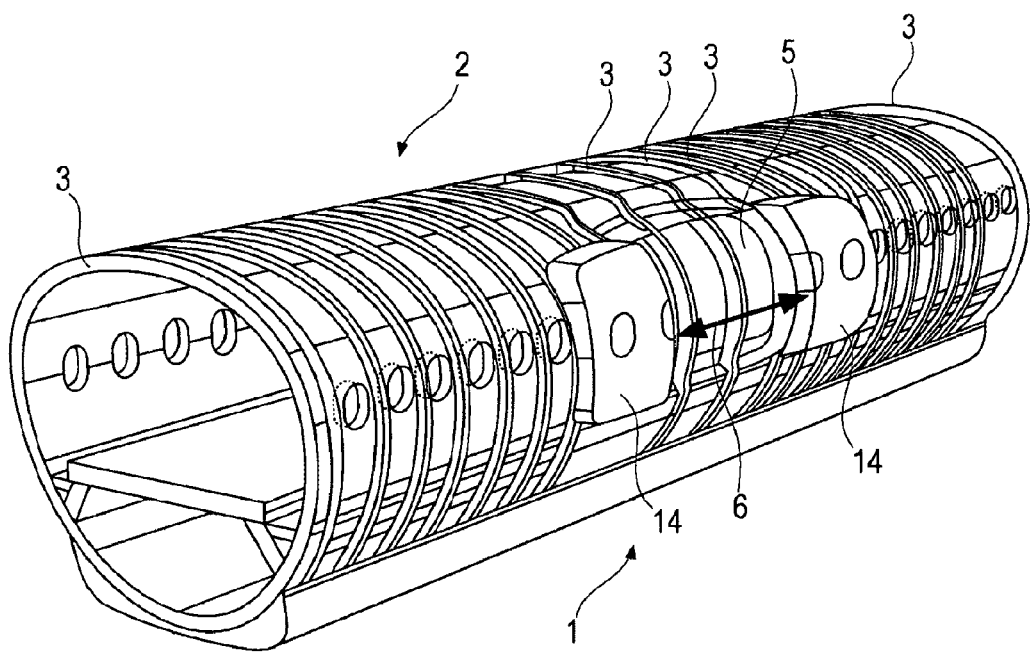
FIG. 2 shows a further perspective representation of the aircraft fuselage section according to an exemplary embodiment without the outer skin construction of the present invention.

As may be seen best from FIG. 2, the aircraft fuselage section 1 has a fuselage skeleton 2 as a primary structure, which includes a plurality of transverse ribs 3 spaced in the longitudinal direction of the aircraft fuselage. The transverse ribs 3 run transverse to the fuselage longitudinal direction of the aircraft fuselage section 1 and stand substantially vertically. In the horizontal direction, the transverse ribs 3 are reinforced by stringers, not shown here, in order to provide the primary support structure with a sufficient spatial rigidity.

An outer skin construction 4 in the form of a plurality of aluminum sheets I mounted on the fuselage skeleton shown in FIG. 2, which are welded as a standard with the transverse ribs 3 in regular spacings, so that one moves starting from the fuselage skeleton 2 shown in FIG. 2 to the fuselage section 1 shown in FIG. 1.

As may be seen from FIG. 1, in turn, the outer skin construction 4 is provided with a door opening 5 with an oversizing 6, whereby this width 6 is selected, such that by means of at least one of the skeletal components, the fuselage opening 5 is subdivided vertically into multiple opening areas 7. Thus, in the embodiment shown in FIG. 1, the door opening 5 is subdivided by two vertically running ribs 3 into three opening areas 7. In other words, the door opening 5 considered in one view is subdivided into three opening areas 7 separated from one another by two ribs 3.

Behind this embodiment is the core idea of forming the door opening 5 with a width 6, which is greater than the respective rib spacing, so that the door opening 5 in each case is subdivided by at least one rib 3 into multiple opening areas 7.

Figure 4:
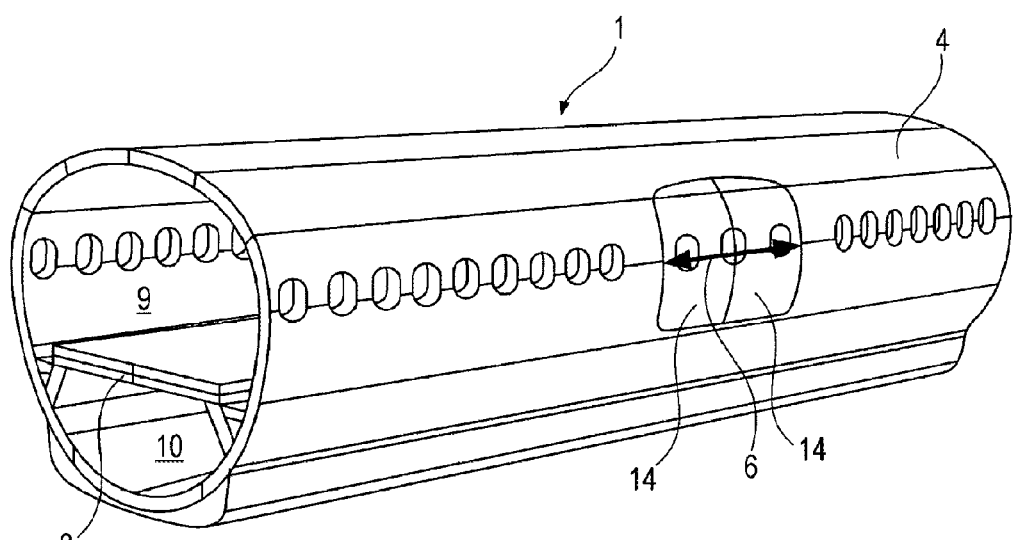
FIG. 4 shows a further perspective representation of the aircraft fuselage section according to an exemplary embodiment of the present invention with a closed cabin door.

While the support structure made up of the fuselage skeleton 2 and outer skin construction 4 is minimally weakened as a result of the widened door opening 5 compared to typical cabin doors, this loss of strength may be compensated, in that for sealing the door opening 5, a cabin door 14 is provided, which itself is formed as a supporting fuselage component. In the exemplary embodiment shown in the figures, the cabin door 14 is formed as a two-part sliding door, whereby the respective door halves have an outer contour, which is aligned with the inner contour of the door opening 5, so that both door halves fit exactly and can be fitted in a flush manner with the outer skin construction 4 in the door opening 5, as shown in FIG. 4. With a corresponding locking mechanism, the doors are locked in the door opening 5 in a force and/or form-locking manner, so that the cabin door 14 cooperates as a supporting component to load transfer in the frame of the support construction made up of the skeleton 2 and outer skin 4.

Figure 3:
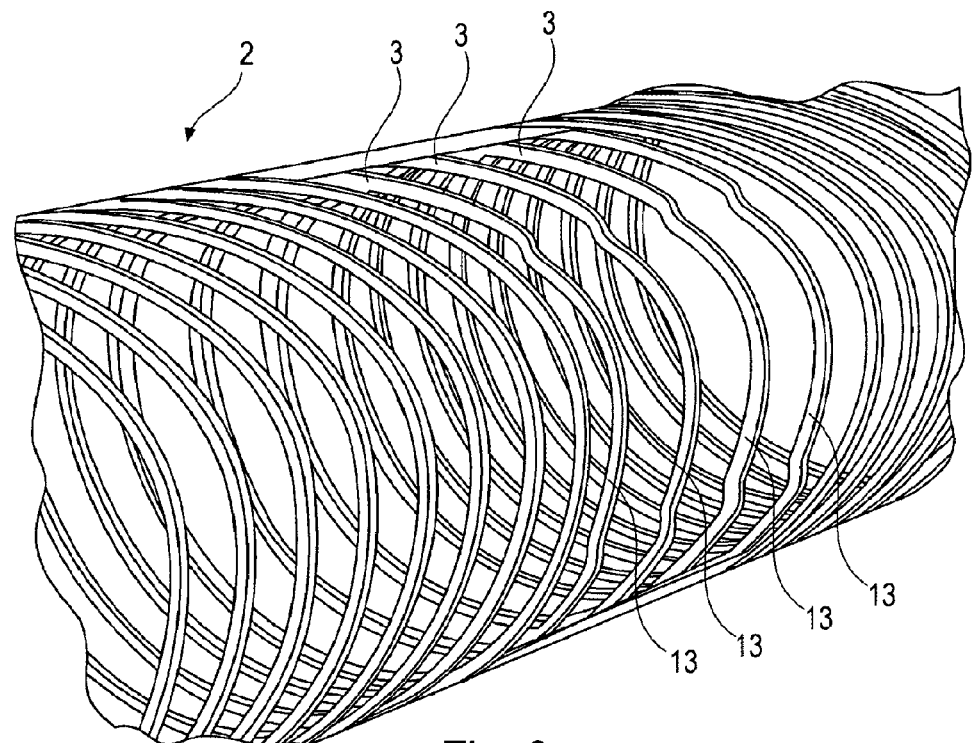
FIG. 3 shows the fuselage skeleton of the aircraft fuselage section according to an exemplary embodiment of the present invention.

Since the cabin door 14 must have a known thickness or strength, in order to be formed as a supporting fuselage component, it may be necessary to reposition the ribs 3 running in the area of the door opening 5 at least in the area of the door opening 5 in the direction of the inner space formed by the aircraft fuselage section 1, as shown in FIG. 2 and especially in FIG. 3, since otherwise, the cabin door 14 could not be fitted in the outer skin construction, such that it is flush with the outer skin construction 4.

Figure 5:
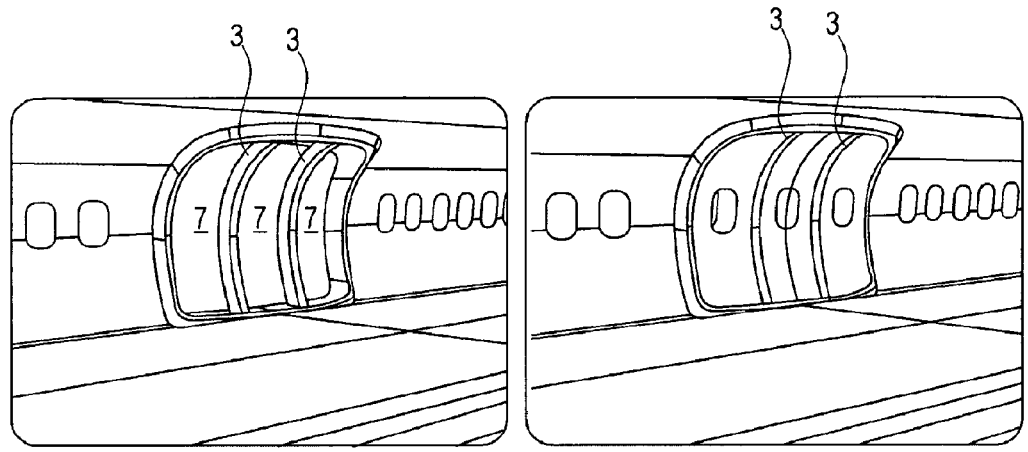
FIGS. 5.1-5.4 show different views of the door opening of the aircraft fuselage section according to an exemplary embodiment of the present invention.

As may be seen from FIGS. 5.1-5.4, which together (perspectively) show views of the door opening 5 crossed by ribs 3, all of the opening areas 7 have a sufficient width so that passengers with hand luggage can step comfortably through.

Figure 6:
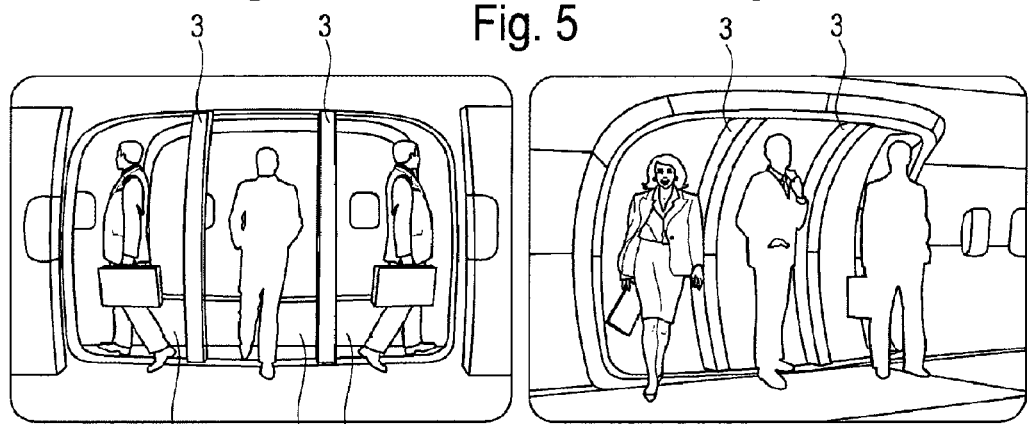
FIG. 6 shows a schematic representation of a passenger cabin area with a front and a rear seating area.
Figure 6:
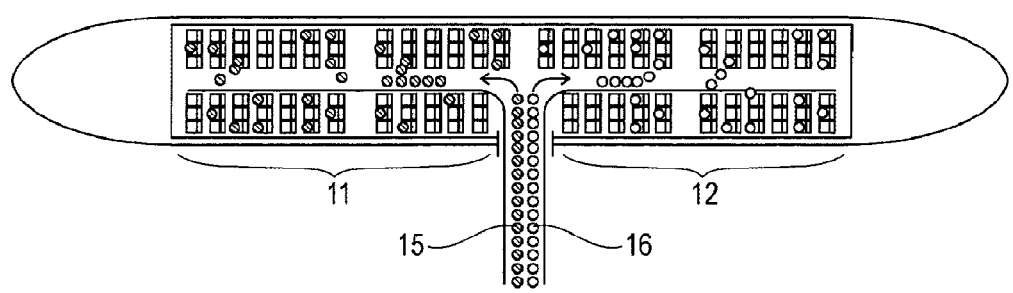

As will be explained with reference to FIG. 6, by means of the aircraft fuselage section 1 or the ribs 3 running in the door opening 5, a flow of passengers 15, 16 may be split into two separate streams of passengers 15 or 16 during boarding at an early time, so that, for example, the first passenger stream 15 can move in the direction of a front seating area 11 and the second passenger stream 16 can move in the direction of a rear seating area of the passenger cabin 9, whereby the boarding may be straightened out in a timely manner and accelerated. In order to use this positive aspect completely, the at least one door opening 5 can be arranged in the outer skin construction of the aircraft fuselage section in a center region of the passenger cabin area 9, so that by locating the door opening 5, the passenger cabin area 9 can be divided into a front seating area 11 and a rear seating area 12. Accordingly, both passenger streams 15 and 16 may be separated from one another shortly after entering the passenger cabin area 9, so that, in contrast to typical boarding methods, it is no longer necessary that a passenger with a ticket for the rear seating area 12 (for example, Economy Class) must cross through the entire front seating area 11 (for example, Business Class), in order to look for his seat, whereby typically, the boarding is substantially delayed. By the arrangement of the door opening 5 in a central region of the passenger cabin and the division of the passenger streams 15, 16, it therefore is no longer necessary that an Economy Class passenger must walk through the complete Business Class in order to go to his seat, whereby the boarding times can be shortened in the end.

In conclusion, it is noted that "including" does not exclude other elements or steps and "a" or "one" does not excluded a plurality. In addition, it is noted that features or steps, which have been described with reference to one of the above exemplary embodiments, also may be used in combination with other features or steps of other above-described exemplary embodiments. Furthermore, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An aircraft fuselage section of an aircraft fuselage, comprising:
   a fuselage skeleton with a plurality of ribs spaced in a longitudinal direction of the aircraft fuselage; and
   an outer skin construction mounted on an outside of the fuselage skeleton,
   wherein the outer skin construction provides a door opening having a width and at least one skeletal component of the fuselage skeleton vertically subdivides the door opening into a plurality of opening areas;
   wherein the door opening is subdivided by at least one of the plurality of ribs into the plurality of opening areas.

2. The aircraft fuselage section of claim 1, wherein the at least one of the plurality of ribs subdivides the door opening as considered in one view in the plurality of opening areas separated from one another by the at least one of the plurality of ribs.

3. The aircraft fuselage section of claim 2, wherein the at least one of the plurality of ribs passes substantially vertically through the door opening as considered in one view.

4. The aircraft fuselage section of claim 2, wherein the at least one of the plurality of ribs is repositioned at least in an area of the door opening in a direction of an inner space formed by the aircraft fuselage.

5. An aircraft fuselage section of an aircraft fuselage, comprising:
   a fuselage skeleton with a plurality of ribs spaced in a longitudinal direction of the aircraft fuselage; and
   an outer skin construction mounted on an outside of the fuselage skeleton;
     wherein the outer skin construction provides a door opening having a width and at least one skeletal component of the fuselage skeleton vertically subdivides the door opening into a plurality of opening areas; and
     wherein the at least on skeletal component is formed by two adjacent ribs of the plurality of ribs, which combine in an area of the door opening to form one component.

6. The aircraft fuselage section of claim 1, further comprising an intermediate floor, wherein the aircraft fuselage section is horizontally divided by an intermediate floor into a passenger cabin area and a cargo space, and the door opening is located in an outer skin construction, such that it forms an entrance to the passenger cabin area.

7. The Aircraft fuselage section of claim 6, further comprising a central region, wherein the door opening is arranged in the outer skin construction in a central region of the passenger cabin area.

8. The aircraft fuselage section of claim 7, wherein the passenger cabin area starting from the door opening has a front seating area and a rear seating area.

9. The aircraft fuselage section of claim 1, further comprising: a cabin door with an outer contour aligned with an inner contour of the door opening, so that a cabin door fits and can be fitted in a flush manner in the door opening with the outer skin construction, and wherein the cabin door is formed as a supporting fuselage component.

* * * * *